(12) United States Patent
Bielaβ

(10) Patent No.: US 8,322,681 B2
(45) Date of Patent: Dec. 4, 2012

(54) RELIEF VALVE FOR A TURBOCHARGER

(75) Inventor: Ekkehard Bielaβ, Dresden (DE)

(73) Assignee: A. Kayser Automotive Systesm GmbH (DE)

( * ) Notice: Subject to any disclaimer, the term of this patent is extended or adjusted under 35 U.S.C. 154(b) by 526 days.

(21) Appl. No.: 12/523,569

(22) PCT Filed: Dec. 20, 2007

(86) PCT No.: PCT/EP2007/011300
§ 371 (c)(1),
(2), (4) Date: Dec. 14, 2009

(87) PCT Pub. No.: WO2008/086880
PCT Pub. Date: Jul. 24, 2008

(65) Prior Publication Data
US 2010/0206388 A1    Aug. 19, 2010

(30) Foreign Application Priority Data

Jan. 17, 2007  (DE) .......................... 10 2007 002 432

(51) Int. Cl.
*F16K 31/12* (2006.01)
(52) U.S. Cl. ..................................... 251/30.04; 137/490
(58) Field of Classification Search .................. 137/490; 251/30.04, 38
See application file for complete search history.

(56) References Cited

U.S. PATENT DOCUMENTS

| 2,392,741 | A | * | 1/1946 | Hurlburt | 137/630.22 |
| 3,943,975 | A | * | 3/1976 | Schnittker | 137/630.14 |
| 5,263,679 | A | * | 11/1993 | Bushnell | 251/28 |
| 7,905,254 | B2 | * | 3/2011 | Takeda et al. | 137/630 |

* cited by examiner

*Primary Examiner* — John K Fristoe, Jr.
*Assistant Examiner* — R. K. Arundale
(74) *Attorney, Agent, or Firm* — Price Heneveld LLP

(57) ABSTRACT

The invention relates to a relief valve comprising a first valve body for opening and closing a fluid passageway between a first valve connection and a second valve connection, a second valve body which is disposed on the first valve body and is used for opening and closing a valve passageway located between the first valve connection and a valve interior, a one throttle duct between the valve interior and a face of the first valve body, a spring for opening the second valve body, and an actuator for closing the second valve body. This relief valve further comprising a movable member that can be moved further in the same direction once the second valve body has been closed, thus allowing the first valve body to be opened by having the second valve body engage a valve seat located on the first valve body, and a stop element connected to the second valve body and/or the movable member engages the first valve body via the spring to close the first valve body.

11 Claims, 8 Drawing Sheets

RELIEF VALVE FOR A TURBOCHARGER

BACKGROUND OF THE INVENTION

The present invention relates to a relief valve, in particular to a relief valve for releasing a boost pressure of a turbocharger.

In order to meet increasingly stringent requirements on exhaust emissions of motor vehicles and on the reduction of fuel consumption, actuators for the engine control, e.g. a relief valve of that kind, have to respond to a corresponding actuating signal as fast and precisely as possible. However, this requirement is aggravated by the fact that a spring for closing such a relief valve has to apply a high force in order to keep the valve closed against the incoming dynamic pressure of the turbocharger.

In order to overcome this disadvantage, the laid-open publication DE 102 48 125 A1 suggests a so-called balanced valve in which fluid passageways are disposed in a valve body in order to apply the incoming fluid pressure also to the backside of the valve body. The backside of the valve body is sealed via a membrane. Thus, since the compressive force is the same on each side of the valve body, a weaker spring and a weaker actuator may be built in.

Patent document DE 10 2004 044 439 B4 suggests a relief valve for a turbocharger with a lip-shaped sealing element for sealing a backside of the valve body when the valve body is closed, so that a fluid force acting on the backside of the valve body keeps the valve body closed while the fluid pressure acting on the backside is released via a radial annular clearance of the sealing element 4 when the valve opens, in order to open the valve body by the incoming dynamic pressure on a face of the valve body. The lip-shaped sealing element has a larger effective diameter than a seal seat of the valve body, so that excess force is generated in a closing direction, which is used to keep the valve closed.

SUMMARY OF THE INVENTION

It is the object of the invention to provide an improved relief valve capable of opening very quickly and having a small size in order to preferably serve as an actuator for the control of a turbocharger of an internal combustion engine. In addition, the required actuator force is to be minimized so that the relief valve itself generates little heat if the relief valve is e.g. actuated by a heat-generating, electromagnetic actuator. In one aspect of the present invention, a relief valve that comprises a first valve body for opening and closing a fluid passageway between at least a first valve connection and at least a second valve connection, a second valve body, disposed on the first valve body, for opening and closing a valve passageway, disposed in the first valve body, between the first valve connection and an interior of the valve, and a throttle duct, preferably a plurality of throttle ducts, establishing a connection between the interior of the valve and a face of the first valve body. The relief valve further comprises a spring for moving or pushing a second valve body in an opening direction of the second valve body and keeping it in this position, an actuator for moving the second valve body in a closing direction, wherein a movable member of the actuator is disposed so as to be movable further in the same direction once the second valve body has been closed, so that the first valve body is movable in an opening direction of the first valve body by an engagement of the second valve body with the valve seat disposed on the first valve body, and wherein a stop element operatively connected to the second valve body and/or the movable member can be engaged with the first valve body by the spring force of the spring in order to move the first valve body in a closing direction with the help of the spring.

As the second valve body enables the fluid passage into the interior of the valve, a fluid pressure acts on a backside of the first valve body in order to support the spring in pushing back the first valve body against the incoming pressure on the face of the first valve body. To open the first valve body, the actuator merely has to close the second valve body and slightly open the first valve body against the spring force and the fluid pressure in the interior of the valve, so that when the first valve is only opened that little, the fluid pressure in the interior of the valve is sucked off via a throttle duct and a Venturi effect acting in the fluid passageway of the first valve body. Accordingly, the fluid pressure is released from the interior of the valve via the throttle duct, while the second valve body closes the valve passageway disposed in the first valve body in order to prevent excess pressure from flowing into the interior of the valve. Now, the further opening of the first valve body up to the complete opening of the relief valve can take place by means of the incoming dynamic pressure at the first valve connection. Thus, the actuator may have a very small configuration, since only little force is required for opening the small, second valve body and for slightly pulling the first valve body open at the beginning of the opening process. The main opening process, however, takes place via the incoming excess pressure at the first valve connection.

When the opening force of the actuator becomes unnecessary when the relief valve is opened, the spring pushes the second valve body open so that excess pressure can flow from the first valve connection into the interior of the valve. The fluid pressure building up in the interior of the valve, together with the spring force, now closes the first valve body against the dynamic pressure acting on a face of the first valve body. Due to this construction of the relief valve, both a weak spring and a weak actuator may be employed. Nevertheless, the valve is able to open and close very quickly due to the pneumatic control.

Preferably, a flow resistance of the valve passageway formed in the first valve body is lower than a flow resistance of the throttle duct(s). By correspondingly matching the flow resistances of the valve passageway on the one hand and the throttle duct on the other hand, a desired pressure build-up in the interior of the valve can be achieved when the first valve body is opened, in order to effect a closing movement.

Preferably, the stop element is configured as a valve spring retainer having fluid passageways at its circumference and being sandwiched between the movable member and the second valve body.

Further preferably, the force of the spring and that of the actuator are dimensioned such that the first valve body, at least when the actuating force of the actuator is low, opens only incompletely in the pressureless state, and a complete opening of the first valve body is caused by the fluid pressure fed into the first valve connection pressing against the face of the first valve body and by a pressure in the interior of the valve escaping via the throttle duct when the second valve body is closed and the first valve body is slightly opened, so that a pressure difference between the face and a backside of the first valve body arises, as illustrated in FIG. 6.

If, for example, an electromagnet having a magnetic core and a magnetic coil is used as an actuator, the actuating force is low when the supply voltage to the magnetic coil is low and the operating temperature is high, since the current intensity becomes low in this state.

Preferably, the first valve body is formed substantially cylindrically and is provided with a plurality of throttle ducts distributed across the circumference of its face, preferably three throttle ducts at a distance of 120°, which are positioned opposite a valve seat and in a flow direction upstream of a seal of the first valve body.

By the arrangement of the throttle ducts opposite the valve seat of the first valve body, an arising Venturi effect can be used to suck off the fluid pressure from the interior of the valve via the throttle ducts. A high Venturi effect particularly arises due to the dynamic pressure drop when the first valve body is slightly opened, so that in this state the fluid pressure is specially effectively sucked off from the interior of the valve. In addition, floating of the first valve body in the beginning phase of the opening process of the first valve body can be prevented, which would otherwise appear as a result of the Venturi effect. Under worst case conditions, this floating might lead to a regulating oscillation or resonance in the engine control. Moreover, the service lives of the valve seat and of the seal of the first valve body are influenced by impacting on the valve seat when such floating occurs. However, since the Venturi effect is used to suck off the fluid pressure from the interior of the valve, such float phenomenon is safely prevented, whereby the engine control is improved and the service life of the relief valve is increased.

Preferably, the throttle duct can at least partly be closed by means of the stop element. By the throttle duct being closed, e.g., by the stop element when the second valve body opens, a pressure build-up in the interior of the valve can be accelerated and/or increased. Thereby, on the one hand, the period for closing the first valve body may be shortened and, on the other hand, the spring may be dimensioned with low force, since the high fluid pressure in the interior of the valve supports the spring in the closing process of the relief valve. Thus, a weak spring is advantageous as it allows for a faster opening process of the first valve body if only a low spring force is to be overcome.

Preferably, the first valve body is provided with a sealing element on the circumference thereof in order to seal the interior of the valve against the second valve connection.

Further preferably, the sealing element is designed so as to at least almost entirely seal by axial application of a sealing lip against a corresponding seal seat, when the first valve body is closed, and to allow for a temporary flow between the interior of the valve and the second valve connection by a radial play of the sealing lip, when the first valve body is opened.

The release of the fluid pressure from the interior of the valve may be accelerated further if the sealing element for sealing the first valve body against the second valve connection is configured as a sealing lip having a predetermined radial play in the cylinder bore of the valve housing, so that a flow can form from the interior of the valve to the second valve connection within the radial play.

Preferably, the sealing element additionally comprises a washer for limiting a radial play of the sealing element, so that only a predetermined flow is allowed. Blow-by gases, i.e., combustion gases, flowing in the internal combustion engine between the pistons and the cylinders into the crankcase and then into the intake section also flow into the turbocharger and thus into the relief valve. These blow-by gases contain combustion residues and engine oil. Due to the combustion residues and the engine oil, the sealing lip may swell. By the additional arrangement of the washer on the sealing element, a radial clearance may be exactly defined for a long service life, since the annular clearance always remains the same size and is not influenced by a swelling of the sealing lip due to oil and combustion residues contained in blow-by gases.

Preferably, the relief valve is an insertion-type valve to be inserted into a housing and sealing an interior of the housing by means of a flange having a seal, which serves as a second valve connection, wherein the valve seat is disposed in the housing.

Further preferably, the first valve body is guided in the relief valve such that an axis of the first valve body can be pivoted about a predetermined angle with respect to an axis of the actuator in order to compensate for manufacturing and installation tolerances, so that a uniform abutment of the seal of the first valve body against a valve seat of the housing is ensured.

Another aspect of the present invention includes a method of opening a relief valve comprising the steps of lifting up the movable member against the spring force, so that the second valve body closes the valve passageway, and further lifting up the movable member, so that the first valve body is raised by the engagement between the second valve body and the valve seat of the first valve body in order to at least partly open the fluid passageway of the first valve body. The method further comprises sucking off the fluid pressure in the interior of the valve via the throttle duct by means of a Venturi effect, when the fluid passageway is partly opened, and pushing the first valve body open by means of the dynamic pressure acting on the face of the first valve body in order to open the relief valve.

Additional steps to the method may include moving the stop element by means of the spring in order to open the second valve body and to hold the second valve body in the opened position, introducing the fluid pressure into the interior of the valve via the opened second valve body in order to apply a compressive force to the first valve body in the closing direction, and closing the first valve body with the help of the spring and the fluid pressure in the interior of the valve against the dynamic pressure acting on the face in order to close the relief valve. Preferably, the method of closing the relief valve may further comprise the step of closing the throttle duct in order to support the closing of the first valve body by a Venturi effect in the fluid passageway.

Another aspect of the present invention is a turbocharger having such a relief valve for releasing a boost pressure.

In addition, according to the invention, an internal combustion engine having a turbocharger and such a relief valve is provided, in which the valve is opened in response to a throttle duct closing signal in order to release the boost pressure into the intake section in front of the turbocharger. An advantageous response of the internal combustion engine is achieved by the valve opening very quickly upon receiving a throttle duct closing signal and accordingly very quickly releasing the boost pressure.

These and other features, advantages and objects of the present invention will be further understood and appreciated by those skilled in the art by reference to the following specification, claims and appended drawings.

In the following, the invention will be explained on the basis of preferred embodiments with reference to the accompanying drawings.

Figure 1:
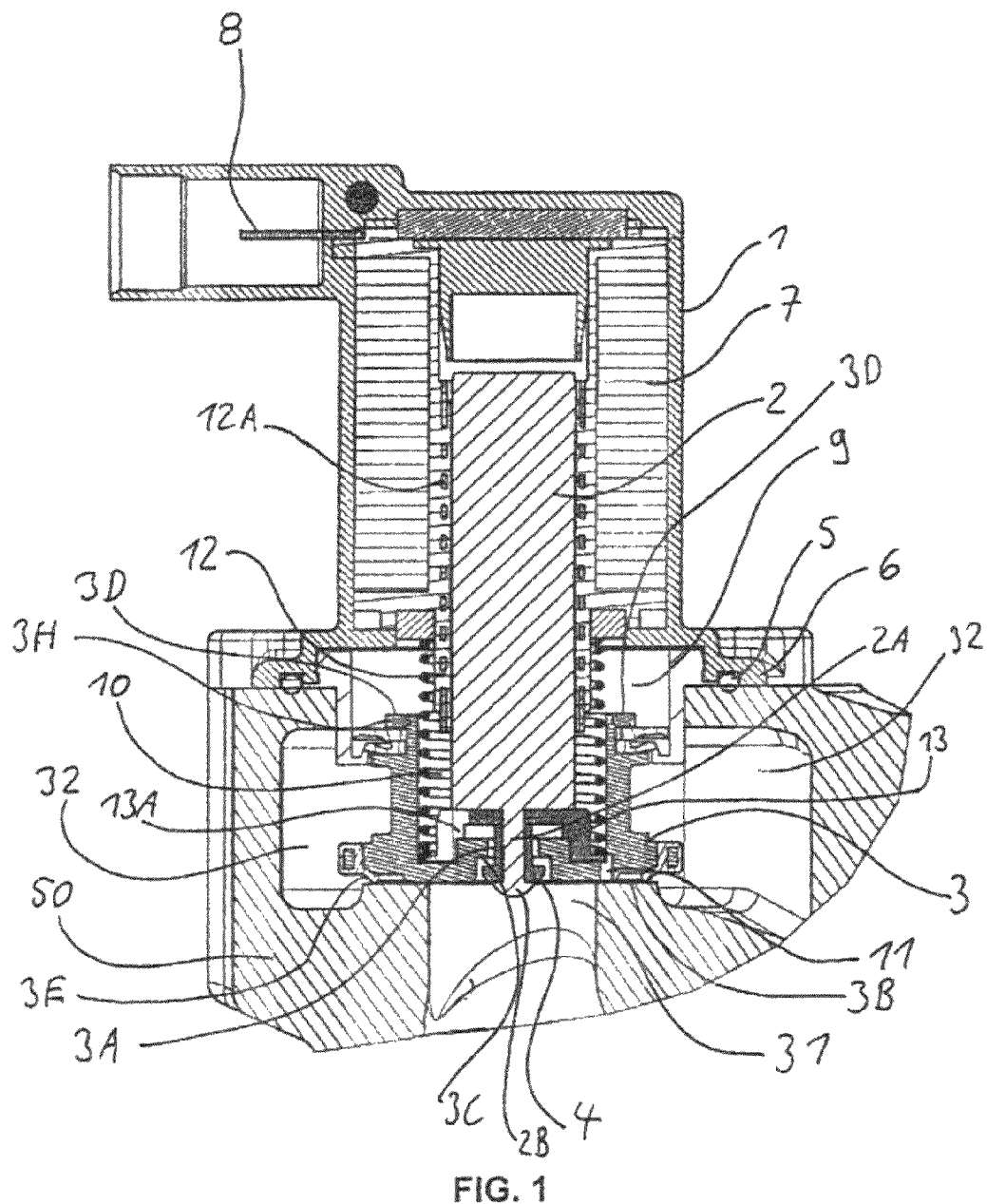
FIG. 1 is a cross-sectional front view through the relief valve inserted into a turbocharger housing 50, showing the closed state of the relief valve.

As is particularly shown in FIGS. 1 to 4, the relief valve is, by way of example, configured as a 2/2-way magnetic valve (2 connections/2 positions) of the normally closed type (normally closed two-way two position valve) and/or as a valve of the so-called insertion type. Such a magnetic valve comprises an electromagnetic coil 7 preferably configured in a cylindrical fashion and capable of being supplied with current via an electrical connection 8. Within an axial longitudinal opening of the cylindrical coil 7 is arranged a magnet armature 2, which in response to a current supply to the electrical coil 7 is drawn up in the view in the figures. The magnet armature 2 is preferably guided by means of a Teflon-coated bearing shell 12 and formed of a magnetic material, e.g. iron.

The bearing shell 12 is preferably configured as a coil body with a support element 12A, as is described in DE 10 2005 000 985.9, the coil receiving device of which is incorporated herein by reference in its entirety. In this coil receiving device, the coil body 12 and the support elements 12A thereof are configured as hollow cylinders, wherein the support element 12A is provided with recesses or openings distributed across the circumference thereof, which in a preferred embodiment extend through the walls of the support element 12A.

Preferably, a spacer, not shown, is arranged at an upper stop position of the magnet armature 2 in order to prevent the magnet armature 2 from sticking too strongly to its upper stop position, as is disclosed in DE 10 2004 044 439 B4, the actuator of which, with magnet armature 2 and coil 7, is incorporated herein by reference in its entirety. A second valve body 4 and a stop element 13, preferably in the form of a valve spring retainer, are arranged at a distal lower end of the magnet armature 2. The second valve body 4 is formed of a suitable material, such as metal (stainless steel), so that it has a long service life. The valve spring retainer 13 is formed of a suitable material, such as plastics, which withstands high temperatures. For this, glass-fibre reinforced polyamides and/or mineral reinforced polyamides are suited.

In assembly, the valve spring retainer 13 is fitted onto the small-diameter section 2A of the magnet armature 2, and then the second valve body 4 is fitted, wherein the elements 4, 13 are held on the distal end (the lower end in FIGS. 1 to 4) of the magnet armature 2 by a thickening 2B of the magnet armature 2 in order to move integrally with the magnet armature 2. Alternatively, the distal end of the magnet armature 2 may also have a so-called grooved pin with round head (not shown) in order to fix the valve spring retainer 13 and the second valve body 4 on the distal end of the magnet armature 2. Such a grooved pin with round head is pressed into a bore of the magnet armature 2 in order to fix the elements 13 and 4 on the magnet armature 2. Preferably, a grooved pin with round head according to DIN 1476 (ISO 8746) with a thickening at one end thereof is used. However, a different grooved pin with round head may be used as well, such as a grooved pin with round head according to DIN 1471 (ISO 8744), DIN 1472 (ISO 8745) or DIN 1473 (ISO 8740), wherein DIN refers to Deutsches Institut für Normung, aka German Institute for Standardization.

The valve spring retainer 13 provides a positive coupling between a spring 10 and the magnet armature 2 in order to move the magnet armature 2 downward together with the valve spring retainer 13 and the second valve body 4. The valve spring retainer 13 is provided with fluid passageways (not shown in the figures) to the throttle ducts 11. Preferably, the fluid passageways are partly or fully closed when the valve spring retainer 13 is lowered, in order to partly or fully close the passage through the throttle ducts 11.

Moreover, the valve spring retainer 13 acts as a stop element in order to apply a spring force to a first valve body 3 by engagement of the valve spring retainer 13 with the first valve body 3, so that the first valve body 3 can be moved in the closing direction. The first valve body 3 has a seal 3E provided on its face 3B in order to engage with a seal seat 52, so that a fluid passageway 33 between a first valve connection 31 and a second valve connection 32 is closed.

The seal seat 52 is preferably formed in a turbocharger housing 50. The relief valve is configured as a so-called insertion-type valve inserted into the turbocharger housing 50 via a flange 6 sealed on the turbocharger housing 50 via a seal 5. There, a space disposed below the first valve body 3 serves as the first valve connection 31 connected to a pressure side of the turbocharger, while an annular space formed on the outer circumference of the substantially cylindrical first valve body 3 serves as the second valve connection 32 in the turbocharger housing 50.

If an incoming pressure P1 on the pressure side of the turbocharger is to be released, the first valve body 3 has to be opened in order to open the fluid passageway 33 between the first valve connection 31 and the second valve connection 32. The valve may be used both on the compressor side for controlling the boost pressure and on the turbine side for serving as a so-called wastegate valve.

Furthermore, in the first valve body 3 is disposed a throttle duct 11 providing a connection between a face 3B of the valve body 3 and a backside 3D of the valve body 3 and an interior 9 of the valve. The interior 9 of the valve is configured as a pressure space capable of applying a fluid pressure P3 to the backside 3D of the first valve body 3 in order to apply a fluid pressure force in the closing direction of the first valve body 3. To this end, the interior 9 of the valve is sealed against the second valve connection 32, which is configured as an annular space, by means of a sealing element 14. This sealing may be achieved by means of a membrane or a piston ring.

Preferably, however, a lip-shaped sealing element 14A is used, which abuts against an axial seal seat 15 of the valve housing when the first valve body 3 is closed, in order to ensure an almost complete seal of the interior 9 of the valve with respect to the second valve connection 32. When the first valve body 3 is opened, this lip-shaped sealing element 14A permits, by means of a radial play, a large predetermined flow between the interior 9 of the valve and the second valve connection 32.

Preferably, a washer 14B is disposed adjacent to the sealing lip 14A. Blow-by gases, i.e., combustion gases, flowing in the internal combustion engine between the pistons and the cylinders into the crankcase and then into the intake section also flow into the turbocharger and thus into the relief valve. These blow-by gases contain combustion residues and engine oil. Due to the combustion residues and the engine oil, the sealing lip 14a formed of fluorosilicone rubber (MFQ/FVMQ) or silicone rubber (MVQ/VMQ) may swell.

However, the flow between the interior 9 of the valve and the second valve connection 32 is preferably restricted by a relatively narrow radial clearance on the washer 14B, so that a throttle effect forms at this point. The radial clearance of the sealing element 14A should have a very large cross-sectional area so that the fluid flowing past the lip-shaped sealing element 14A does not deform the lip of the sealing element 14A. The cross-section of the opening of the washer 14B should be smaller up to maximally twice as large as the cross-section of the valve passageway 3A.

Due to the swelling of the sealing lip 14A on account of oil residues and combustion residues, a throttle clearance would change during the service life thereof, which is not desired. Thus, a defined annular clearance with a defined throttle effect can be provided by means of the washer 14B. There, the annular clearance of the sealing lip 14A is larger than that of the washer 14B in order to prevent the sealing lip 14A from being deformed due to a strong fluid flow, so that the throttle effect is primarily created by the washer 14B.

Preferably, the first valve body 3 has a mounting ring 3H on its backside 3D, which is clipped into a groove of the valve body 3. However, the mounting ring 3H may also be connected to the first valve body 3 by flanging or welding. The sealing element 14 is fixed to the first valve body 3 by the mounting ring 3H.

An effective diameter of the seal of the sealing lip 14A has approximately the same size as an effective diameter of the seal 3E of the first valve body 3, so that the fluid pressure P1 acting on the face 3B of the first valve body 3 is approximately the same as on the backside 3D of the valve body 3. Depending on the construction of the relief valve, the effective diameter of the sealing element 14 may also be formed larger or smaller than the effective diameter of the seal 3E. In relation to the actuating force of the magnet armature 2 and the spring 10 with selected spring force and bias, the designer may construct the diameters of the sealing element 14 and the seal 3E accordingly, in order to obtain a desired characteristic of the relief valve.

In addition to acting as a valve spring retainer and as a stop element for pushing or moving the first valve body 3 downward, the stop element 13 may also serve as a valve element for partly or fully closing the throttle duct 11 when the stop element 13 is in its lower position in which it engages the first valve body 3.

Figure 5:
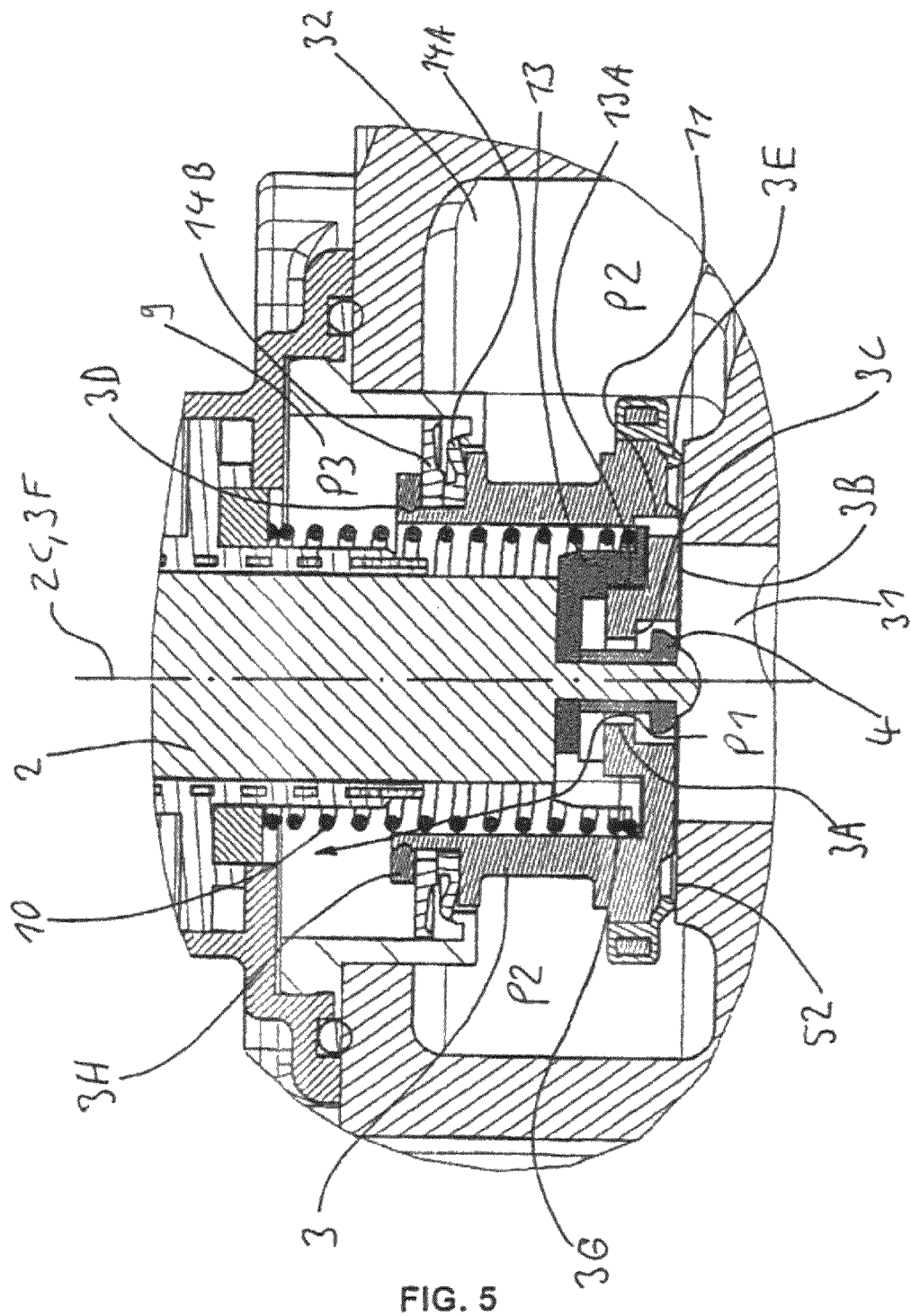
FIG. 5 is an enlarged cross-sectional front view of the closed state of the relief valve shown in FIG. 1.

In addition, the first valve body 3 is preferably guided by a piston-shaped section 3G with a certain play within a cylindrical surface 13A of the stop element 13, as is shown in FIG. 5. This play is necessary in order to permit a certain amount of pivoting of an axis 3F of the first valve body 3 with respect to an axis 2C of the magnet armature 2 if the valve is an insertion-type valve, wherein the valve seat 52, with which the first valve body 3 engages, is not part of the valve but of the housing 50 into which the relief valve is inserted. Due to manufacturing tolerances, a uniform abutment of the seal 3E of the valve body 3 on the valve seat 52 of the turbocharger housing 50 is to be ensured by this predetermined pivoting of the axis 3F of the valve body 3. The washer 14B radially movably disposed on the first valve body 3 to allow for a tilting of the first valve body 3.

In operation, the closed state of the relief valve shown in FIGS. 1 and 5, the seal 3E of the first valve body 3 abuts against the seal seat 52 of the turbocharger housing 50 in order to seal between the first valve connection 31 and the second valve connection 32, so that no flow is possible between the two valve connections 31, 32. In this state, the second valve body 4 is opened and allows the incoming excess pressure P1 on the first valve connection 31 to flow into the interior 9 of the valve, which in turn is sealed with respect to the second valve connection 32 via the sealing element 14. In this manner, with the same pressure (P1=P3), substantially the same fluid forces act on the face 3B of the first valve body 3 and the backside 3D of the first valve body 3 if the effective diameter of the seal 3E is equal to that of the sealing element 14. Depending on the construction of the valve, the diameter of the sealing element 14 may also be slightly larger or smaller than the diameter of the seal 3E. In this manner, the designer is able to adjust desired balances of power in relation to the force of the actuator 2 and the force of the spring 10.

Figure 2:
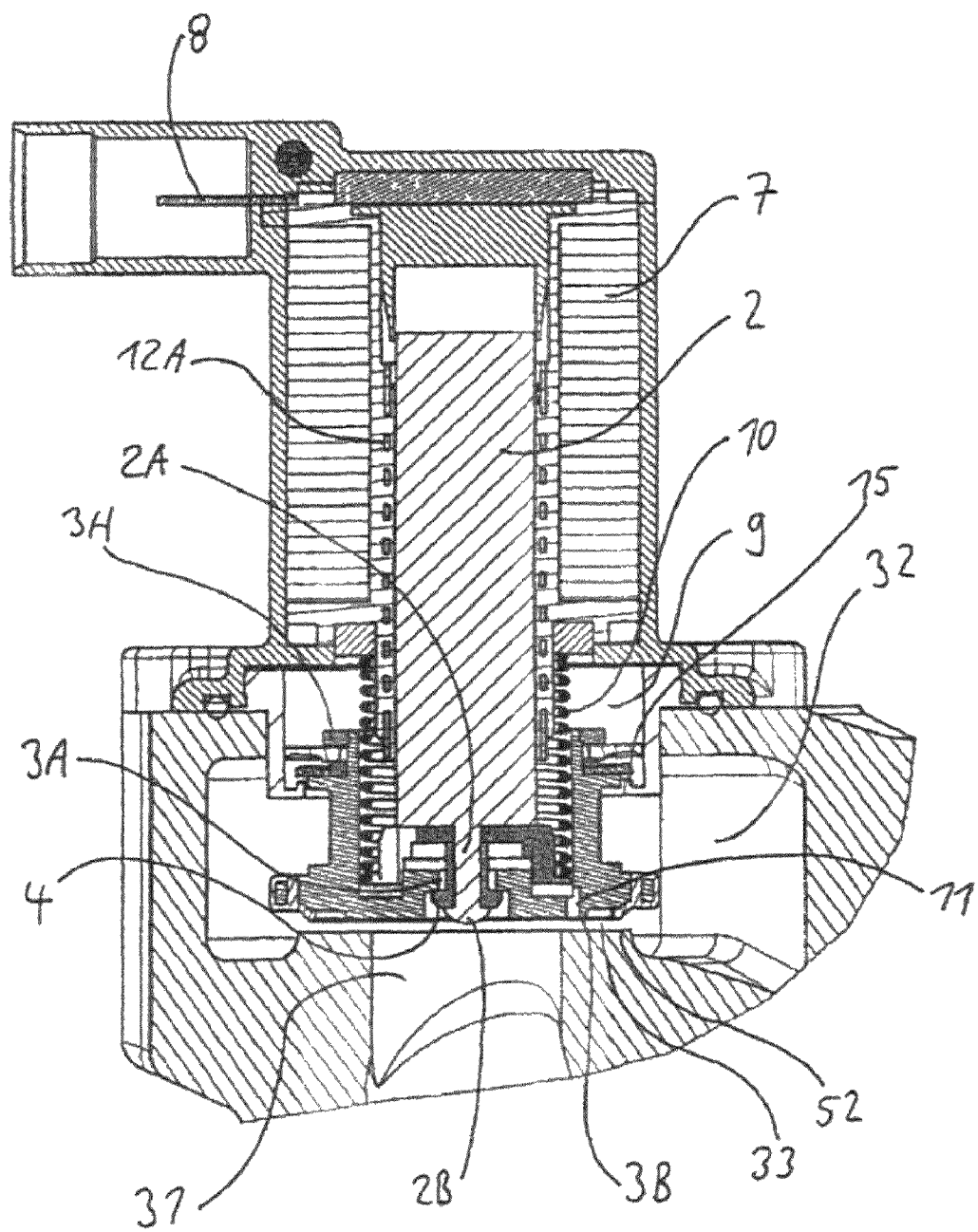
FIG. 2 is a cross-sectional view through the relief valve, wherein a magnetic coil is supplied with current and the first valve body is already partly opened.
Figure 6:
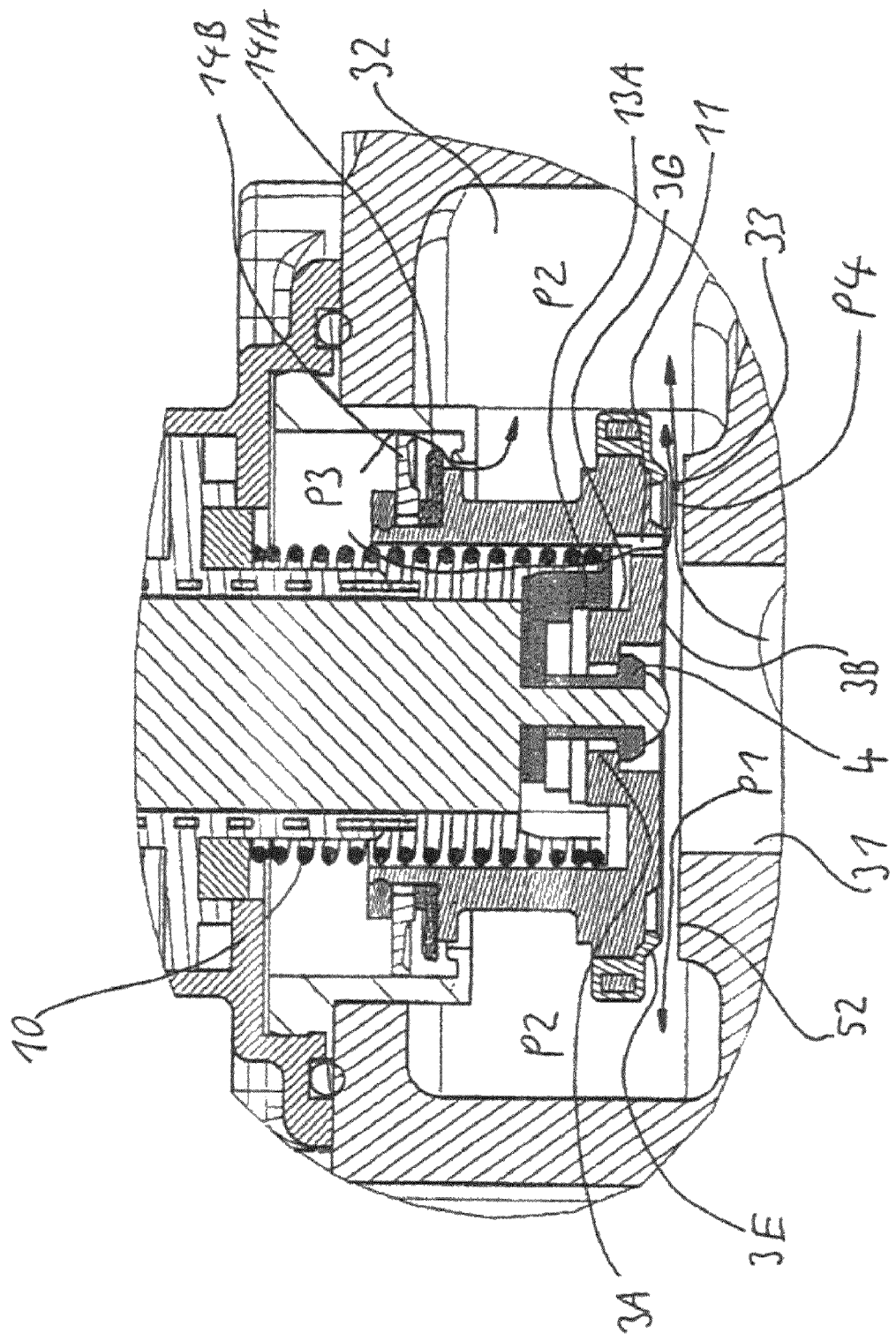
FIG. 6 is an enlarged cross-sectional front view of the partly opened state of the relief valve, as is shown in FIG. 2.

If the valve is to be opened, an electric current is supplied to the coil 7 via the electrical connection 8 in order to excite the coil 7. Thereby, the magnet armature 2 is pulled upward and takes the second valve body 4 and the valve spring retainer 13 with it. Thereby, the second valve body 4 is engaged with the valve seat 3C formed within the valve body 3, as is shown in FIGS. 2 and 6. By the engagement of the second valve body 4 with the valve seat 3C, the valve passageway 3A between the first valve connection 31 and the interior 9 of the valve is closed. If the first valve body 3 is slightly lifted up from its seat 52 due to the further upward movement of the magnet armature 2 with the second valve body 4, the pressure P3 in the interior 9 of the valve can flow off via the throttle duct 11.

Figure 3:
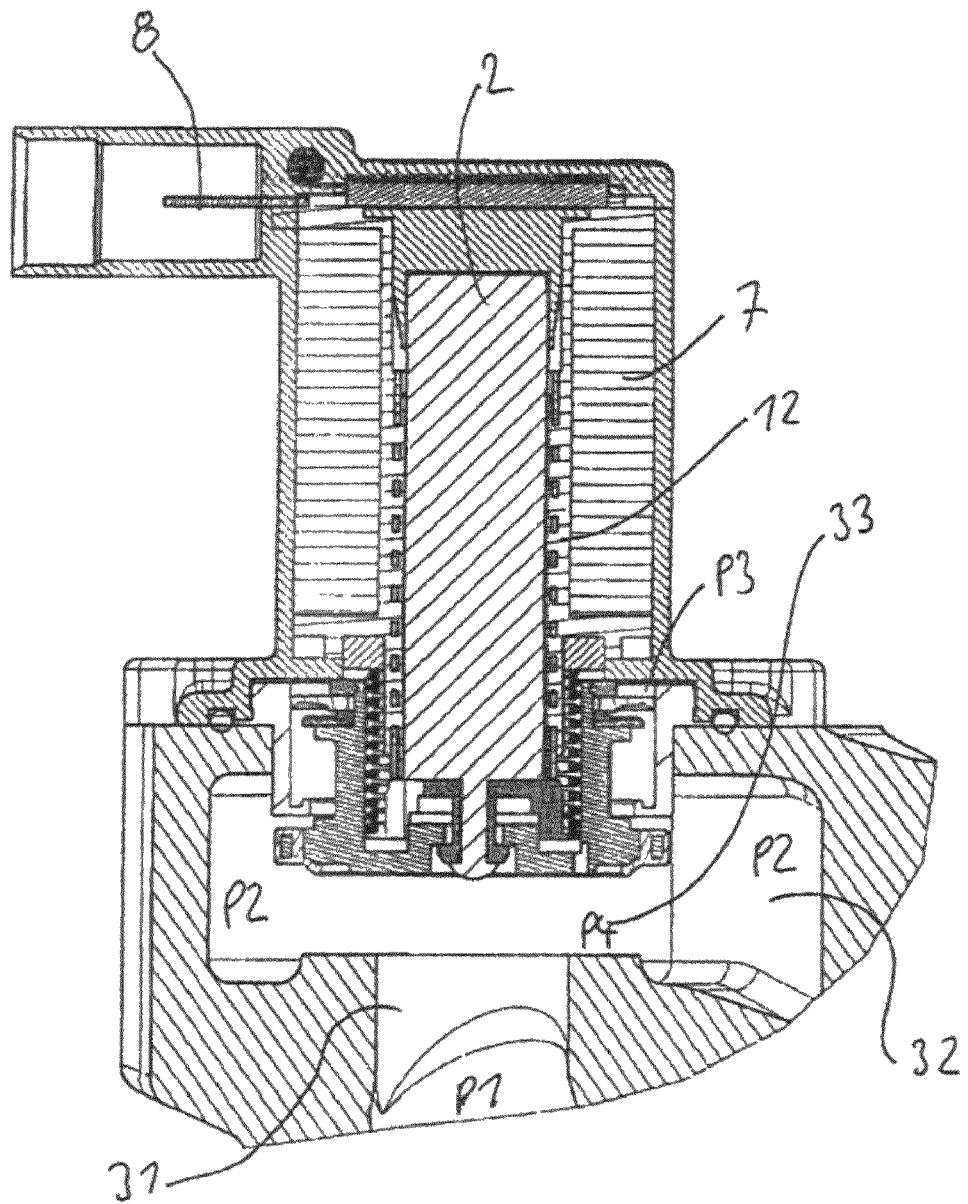
FIG. 3 is a cross-sectional front view through the relief valve in the fully opened state.
Figure 4:
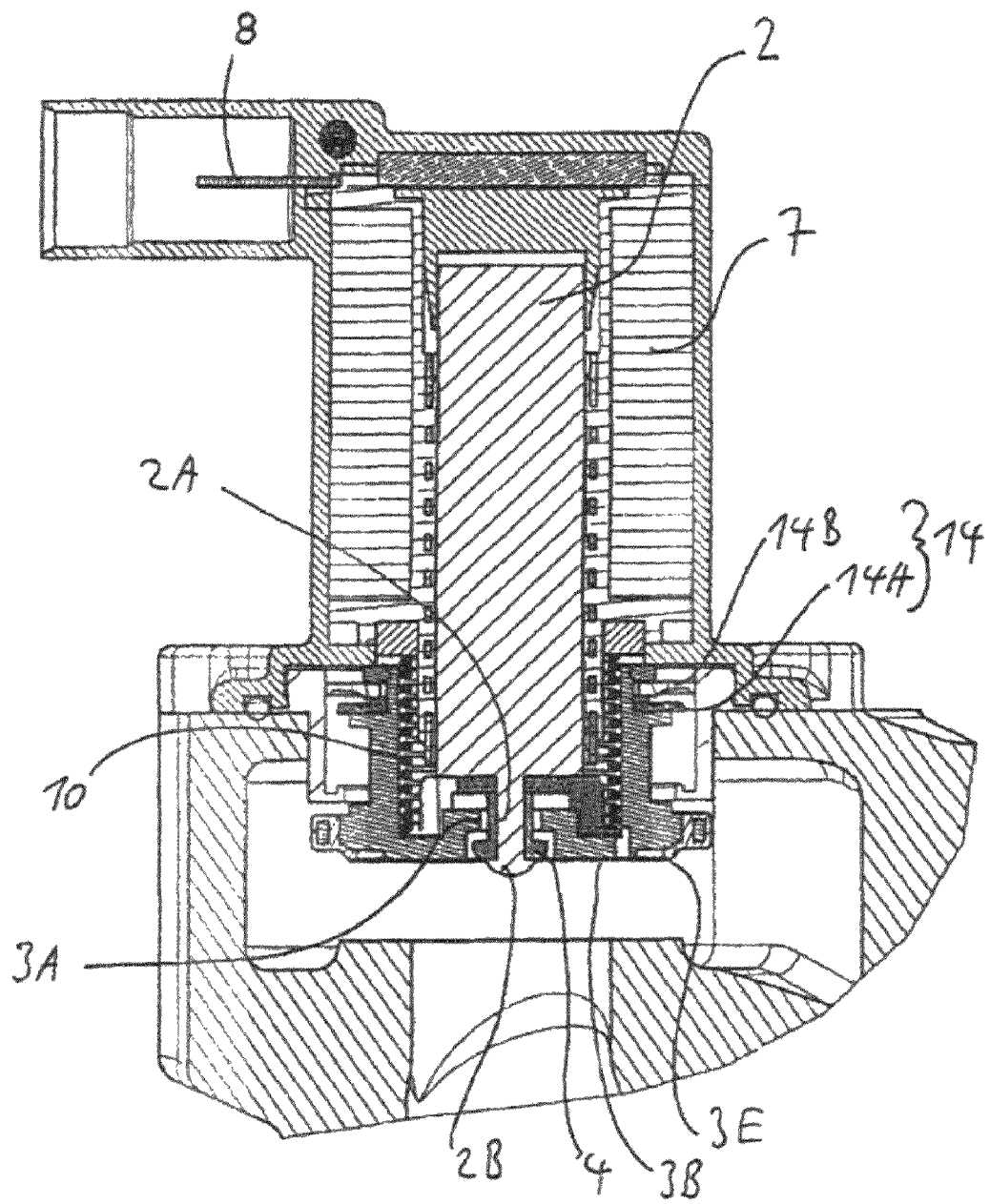
FIG. 4 is a cross-sectional front view through the relief valve illustrating the fully opened state of the first valve body after removal of the actuator force, wherein the second valve body is open.
Figure 7:
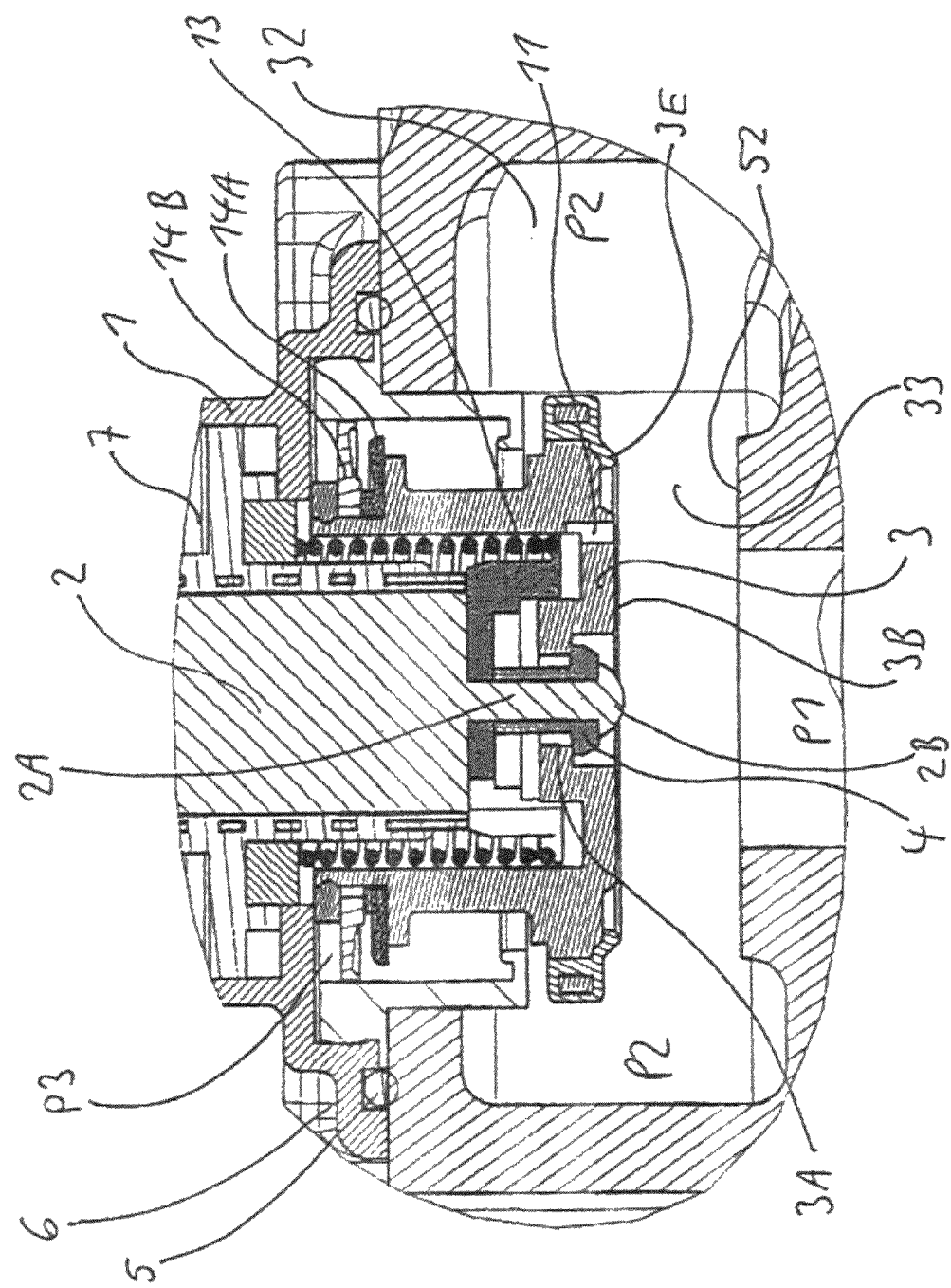
FIG. 7 is an enlarged cross-sectional front view of the fully opened state of the relief valve, as is shown in FIG. 3.

Since the first valve body 3 is only slightly opened, a Venturi effect arises in the fluid passageway 33 between the first valve connection 31 and the second valve connection 32 due to the dynamic pressure drop, which effect leads to a strong vacuum P4. This dynamic pressure drop is used to quickly release the fluid pressure P3 from the interior 9 of the valve via the throttle duct 11. Due to the reduction of the fluid pressure P3 in the interior 9 of the valve, the valve body 3 is now moved upward, i.e., in an opening direction, due to the excess pressure P1 on the first valve connection 31. The Venturi effect can also lead to a vacuum at least temporarily arising in the interior 9 of the valve, which sucks the valve body 3 upward. The fully opened state of the relief valve, i.e., of the valve body 3, is illustrated in FIGS. 3 and 7. In this state, is second valve body 4 is closed due to the pulling force of the magnet armature 2.

Figure 8:
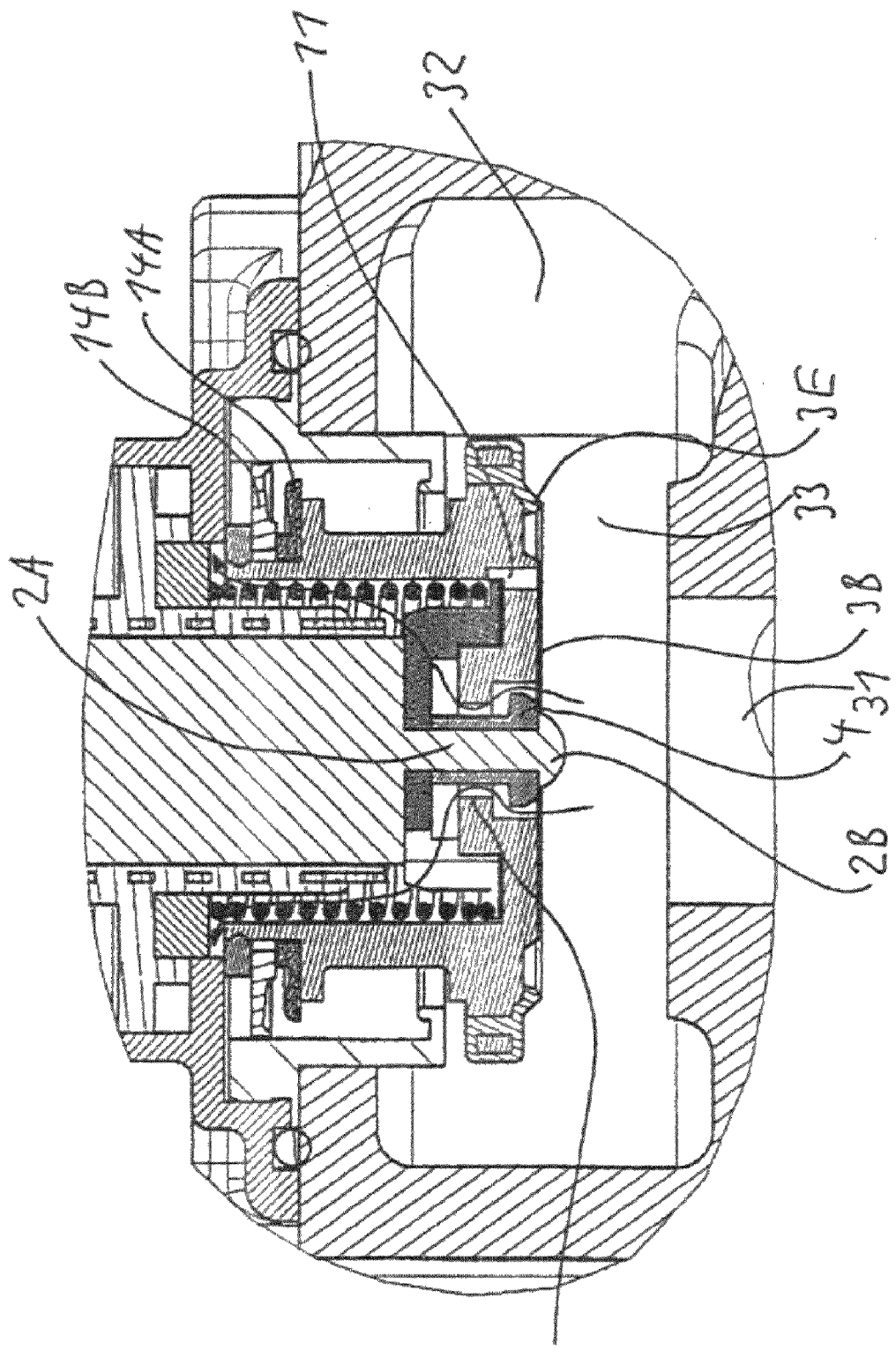
FIG. 8 is an enlarged cross-sectional front view of the fully opened state of the first valve body, wherein the second valve body is opened by the spring force after removal of the actuator force, as is also shown in FIG. 4.

If the relief valve is to be closed starting from the fully opened state shown in FIGS. 3 and 7, this is done by simply interrupting the current supply to the coil 7 via the electrical connection 8. Thereby, the electromagnetic force on the magnet armature 2 is released so that the spring 10 can push down the valve spring retainer 13 with the second valve body 4 and the magnet armature 2 in order to lift the second valve body 4 from the seal seat 3C of the first valve body 3. In other words, the second valve body 4 opens the valve passageway 3A, as is particularly illustrated in FIGS. 4 and 8.

Thereby, a connection is established between the interior 9 of the valve and a dynamic pressure side, i.e. the face 3B of the first valve body 3, in order to feed the dynamic pressure or excess pressure P1 into the interior 9 of the valve. This excess pressure P1 fed into the interior 9 of the valve helps, together with the spring 10, to move the valve body 3 in a closing direction. This can preferably be accelerated by the throttle duct 11 being partly or fully closed by the stop element 13. Alternatively or additionally, the throttle duct 11 may preferably be configured such that a flow resistance through the throttle duct 11 or the plurality of throttle ducts 11 is higher than a flow resistance through the valve passageway 3A. By accordingly adjusting the flow resistances and the flow resistance at the annular clearance of the sealing element 14, a desired characteristic of the relief valve can be achieved.

Thus, in the closed state shown in FIGS. 1 and 5, the first valve body 3 is kept closed by the fluid force acting on the backside 3D, so that only little spring force of the spring 10 is required for keeping the relief valve closed. However, only little force of the actuator 2, 7 is needed to close the small second valve body 4 in order to open the relief valve, since the first valve body 3 is opened by the incoming dynamic pressure P1 on the face 3B after the interior valve pressure P3 has been released. Preferably, a vacuum arises in the interior 9 of the valve when the fluid is sucked out of the interior 9 of the valve via the throttle duct 11 by means of the Venturi effect at the fluid passageway 33.

Thus, a weak spring and/or a small, relatively weak actuator 2, 7 having low current consumption and low heat build-up may be used. The relief valve can nevertheless be opened and closed very quickly. In addition, a floating of the first valve body 3 in the beginning phase of the opening process can be prevented due to the dynamic pressure drop in the fluid passageway on account of the Venturi effect thanks to the provision of the throttle duct 11. Preferably, a plurality of throttle ducts 11, preferably three, are disposed on the circumference of the face 3B at a mutual distance of 120° opposite the valve seat 52, in order to ensure a uniform pressure on the circumference of the fluid passageway 33.

The opening and closing forces arising in the relief valve are preferably designed such that the relief valve, i.e., the first valve body 3 of the relief valve, opens only slightly, e.g., approx. 0.5 to 2 mm, in the pressureless state at least when the supply voltage of the magnetic coil 7 is low and the operating temperature is high, i.e., when the current flow through the magnetic coil 7 is low, and is only fully opened, e.g., approx. 3 to 8 mm, by the excess operating pressure P1 acting on the first valve connection 31. However, a restriction to this range is not intended; instead, different ranges may be chosen depending on the application purpose and the size of the valve.

The present invention is not limited to the described embodiment and may be modified within the scope of the claims. In particular, the actuator does not have to be an electromagnetic actuator, but any other actuator, such as a pneumatic or hydraulic actuator, or a servo motor may be used as well. In addition, the second valve body 4 and the valve spring retainer 13 do not have to be fixed to the magnet armature 2 via the thickening 2A, but a universal joint or a different type of fixation may be used. The relief valve does not necessarily have to be inserted into a turbocharger, but may also be employed somewhere else. There, the valve may also be used for blocking liquids in addition to controlling gases. Furthermore, the valve does not have to be a so-called insertion-type valve, but may be provided with its own lower housing, which comprises the corresponding valve seat 52.

The invention claimed is:

1. A relief valve, comprising:
    a first valve body for opening and closing a fluid passageway between a first valve connection and a second valve connection;
    a second valve body, disposed on the first valve body, for opening and closing a valve passageway, disposed in the first valve body, between the first valve connection and an interior of the relief valve;
    at least one throttle duct that establishes a connection between the interior of the relief valve and a face of the first valve body;
    a spring for moving the second valve body in an opening direction of the second valve body;
    an actuator for moving the second valve body in a closing direction, wherein a movable member of the actuator is disposed so as to be movable further in the same direction once the second valve body has been closed, so that the first valve body is movable in an opening direction of the first valve body by an engagement of the second valve body with a valve seat disposed on the first valve body, and
    wherein a stop element is operatively connected to at least a select one of the second valve body and the movable member, and is engageable with the first valve body by the spring force of the spring in order to move the first valve body in a closing direction with the help of the spring,
    wherein the relief valve is an insertion-type valve to be inserted into housing for sealing an interior of the housing by means of a flange having a seal, which serves as a second valve connection, the valve seat being disposed in the housing.

2. The relief valve according to claim 1, wherein a flow resistance of the valve passageway is lower than a flow resistance of the at least one throttle duct.

3. The relief valve according to claim 1, wherein the stop element is configured as a valve spring retainer having fluid passageways at a circumference of the valve spring retainer, and wherein the valve spring retainer is disposed between the movable member and the second valve body.

4. The relief valve according to claim 1, wherein the force of the spring and that of the actuator are dimensioned such that the first valve body opens only incompletely in a pressureless state, and wherein a complete opening of the first valve body is caused by a fluid pressure fed into the first valve connection pressing against the face of the first valve body and by a pressure in the interior of the relief valve escaping via the at least one throttle duct when the second valve body is closed and the first valve body is slightly opened, such that a pressure difference between the face and a backside of the first valve body arises.

5. The relief valve according to claim 1, wherein the first valve body is formed substantially cylindrically and wherein the at least one throttle duct includes a plurality of throttle ducts distributed across the circumference of the face and positioned opposite a valve seat and in a flow direction upstream of a seal of the first valve body.

6. The relief valve according to claim 1, wherein the at least one throttle duct can at least partly be closed by means of the stop element.

7. The relief valve according to claim 1, wherein the first valve body is provided with a sealing element on the circumference thereof in order to seal the interior of the relief valve against the second valve connection.

8. The relief valve according to claim 5, wherein the plurality of throttle ducts includes three throttle ducts spaced 120° from one another.

9. A relief valve, comprising:
    a first valve body for opening and closing a fluid passageway between a first valve connection and a second valve connection;
    a second valve body, disposed on the first valve body, for opening and closing a valve passageway, disposed in the first valve body, between the first valve connection and an interior of the relief valve;
    at least one throttle duct that establishes a connection between the interior of the relief valve and a face of the first valve body;
    a spring for moving the second valve body in an opening direction of the second valve body;
    an actuator for moving the second valve body in a closing direction, wherein a movable member of the actuator is disposed so as to be movable further in the same direction once the second valve body has been closed, so that the first valve body is movable in an opening direction of the first valve body by an engagement of the second valve body with a valve seat disposed on the first valve body, and wherein a stop element is operatively connected to at least a select one of the second valve body and the movable member, and is engageable with the first valve body by the spring force of the spring in order to move the first valve body in a closing direction with the help of the spring, wherein the first valve body is provided with a sealing element on the circumference thereof in order to seal the interior of the relief valve against the second valve connection, wherein the sealing element is substantially sealed against a corresponding seal seat by a sealing lip, when the first valve body is closed, and wherein the sealing element allows for a temporary flow between the interior of the relief valve and the second valve connection by a radial play of the sealing lip, when the first valve body is opened.

10. A relief valve comprising:
a first valve body for opening and closing a fluid passageway between a first valve connection and a second valve connection;
a second valve body, disposed on the first valve body, for opening and closing a valve passageway, disposed in the first valve body, between the first valve connection and an interior of the relief valve;
at least one throttle duct that establishes a connection between the interior of the relief valve and a face of the first valve body;
a spring for moving the second valve body in an opening direction of the second valve body;
an actuator for moving the second valve body in a closing direction, wherein a movable member of the actuator is disposed so as to be movable further in the same direction once the second valve body has been closed, so that the first valve body is movable in an opening direction of the first valve body by an engagement of the second valve body with a valve seat disposed on the first valve body, and
wherein a stop element is operatively connected to at least a select one of the second valve body and the movable member, and is engageable with the first valve body by the spring force of the spring in order to move the first valve body in a closing direction with the help of the spring,
wherein the first valve body is provided with a sealing element on the circumference thereof in order to seal the interior of the relief valve against the second valve connection,
wherein the sealing element additionally comprises a washer for limiting a radial play of the sealing element so that only a predetermined flow is allowed.

11. A relief valve, comprising:
a first valve body for opening and closing a fluid passageway between a first valve connection and a second valve connection;
a second valve body, disposed on the first valve body, for opening and closing a valve passageway, disposed in the first valve body, between the first valve connection and an interior of the relief valve;
at least one throttle duct that establishes a connection between the interior of the relief valve and a face of the first valve body;
a spring for moving the second valve body in an opening direction of the second valve body;
an actuator for moving the second valve body in a closing direction, wherein a movable member of the actuator is disposed so as to be movable further in the same direction once the second valve body has been closed, so that the first valve body is movable in an opening direction of the first valve body by an engagement of the second valve body with a valve seat disposed on the first valve body, and
wherein a stop element is operatively connected to at least a select one of the second valve body and the movable member, and is engageable with the first valve body by the spring force of the spring in order to move the first valve body in a closing direction with the help of the spring,
wherein the relief valve is an insertion-type valve to be inserted into a housing for sealing an interior of the housing by means of a flange having a seal, which serves as a second valve connection, the valve seat being disposed in the housing,
wherein the first valve body is guided in the relief valve such that an axis of the first valve body can be pivoted about a predetermined angle with respect to an axis of the actuator in order to compensate for manufacturing and installation tolerances, such that a uniform abutment of the seal of the first valve body against a valve seat of the housing is ensured.

* * * * *